Oct. 11, 1932.   H. K. RADER   1,881,943
JOINT
Filed May 14, 1930
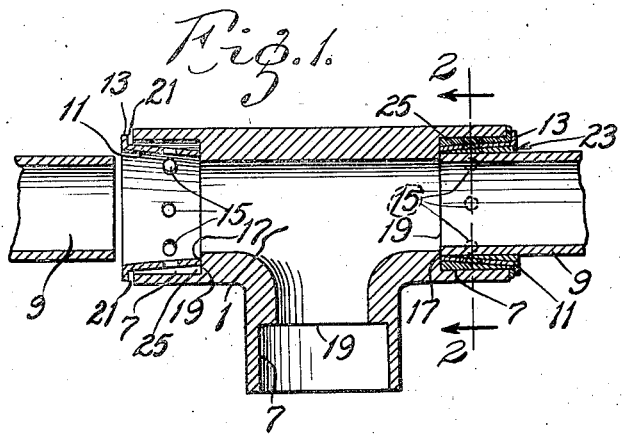
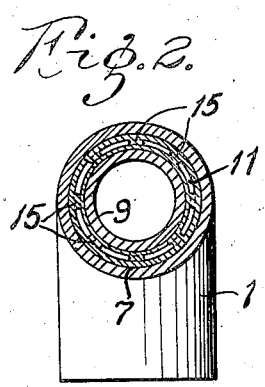
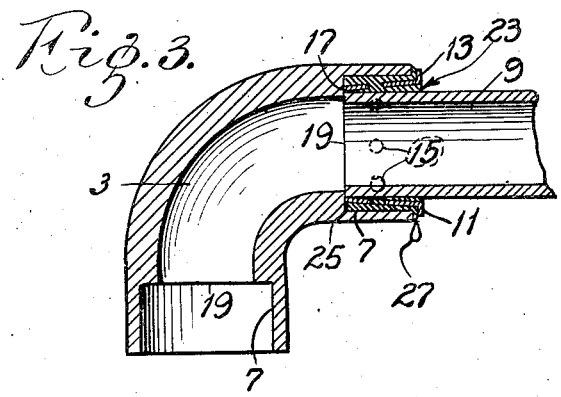
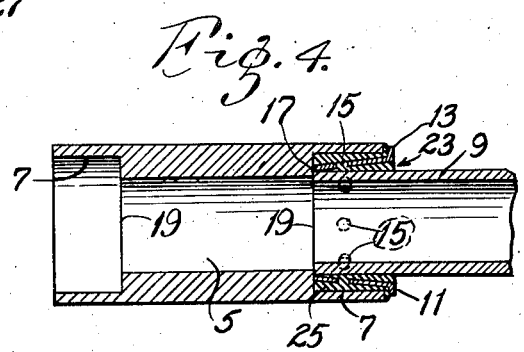
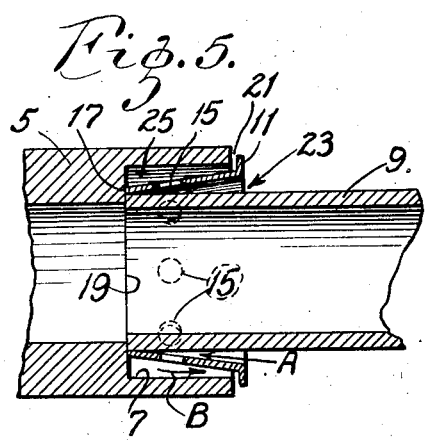

Patented Oct. 11, 1932

1,881,943

UNITED STATES PATENT OFFICE

HAROLD K. RADER, OF PORT HURON, MICHIGAN, ASSIGNOR TO MUELLER BRASS CO., OF PORT HURON, MICHIGAN, A CORPORATION OF MICHIGAN

JOINT

Application filed May 14, 1930. Serial No. 452,451.

This invention relates to joints, and with regard to certain more specific features, to joints located between fittings and pipe or the like.

Among the several objects of the invention may be noted the provision of a joint in which a sealing material is introduced, said joint including means for positively causing flow or circulation of said sealing material throughout a joint; and the provision of means of the class described which is exceedingly simple in operation. Other objects will be in part obvious and in part pointed out hereinafter.

The invention accordingly comprises the elements and combinations of elements, features of construction, and arrangement of parts, which will be exemplified in the structure hereinafter described, and the scope of the application of which will be indicated in the following claims.

In the accompanying drawing, in which is illustrated one of various possible embodiments of the invention, Fig. 1 is a longitudinal section showing the invention applied to a T;

Fig. 2 is a cross section taken on line 2—2 of Fig. 1;

Fig. 3 is a view similar to Fig. 1 showing the invention applied to another form of fitting;

Fig. 4 shows the invention applied to a third form of fitting; and,

Fig. 5 is an enlarged fragmentary section showing the invention without sealing material applied thereto.

Similar reference characters indicate corresponding parts throughout the several views of the drawing.

Referring now more particularly to Fig. 1, there is illustrated a fitting 1 comprising a T. This fitting is illustrative and as shown in Figs. 3 and 4, the invention may be applied to other shapes of fittings such as an elbow 3 (Fig. 3) or a nipple 5 (Fig. 4).

The fittings 1, 3, 5 (these being exemplary) are counterbored as shown at numeral 7 in order to loosely receive a pipe 9 which telescopes into said counterbore. The fit between the counterbore 7 and the pipe 9 is loose enough to permit the reception of a thimble or sleeve 11 which is adapted to slide over the pipe 9 and enter said counterbore 7. This thimble comprises a tapered cup-shape of relatively thin metal, such as sheet metal. The tapered portion of the thimble 11 has a flange 13 thereon. In said tapered portion are located a series of peripheral openings 15. The depth of the thimble 11 is of such an order that when the edge 17 of the small end thereof engages the bottom 19 of the counterbore 7, the flange 13 is slightly spaced from the end of the fitting as illustrated at numerals 21.

The assembly of parts is shown in Fig. 5. It is to be understood however, that the degree of taper in the joint is exaggerated for purposes of clarity.

Assembly of the parts above described is accomplished by introducing the thimble 11 into the counterbore 7 and thereafter introducing the pipe 9 into the thimble. The thimble and pipe both seat upon the lower end 19 of the counterbore 7 (see Fig. 5). Thereafter the joint is heated and solder or other corresponding sealing material is introduced in the peripheral opening indicated at numeral 23. It will be seen that the space between the pipe 9 and the thimble 11 converges inwardly toward the fitting and away from point of introduction 23 of the solder. The liquid solder or other sealing material has a definite capillary action, the tendency being to move from a large cross sectional area into a smaller one in the direction of arrow A (Fig. 5).

As shown in the drawing, the openings 15 are near the inner edge of the conical shape of the thimble 11 and as the sealing material goes into the converging portion between the thimble and the pipe 9, it reaches said openings 15 and moves through them by capillary action or like phenomenon and is then positioned in the large end 25 of the tapering volume between the fitting and the thimble. From here, it again has the tendency to move into a smaller volume, and this being accomplished by capillary phenomenon, it moves in the direction of the arrow B shown in Fig. 5. Thus the sealing material moves out of the space 21 between the flange 13 and the end of the fitting.

Thus it will be seen that in effect, the thimble is a circulating device which permits the introduction of solder or sealing material at an exterior point, causes it to circulate inwardly and then outwardly and then to appear at a location such as 21. When the solder appears at the location 21, the operator knows positively that the joint has been filled with solder and that a perfect seal has been effected. After the solder appears at the region 21, the supply of solder is taken away and thereafter the solder is allowed to cool in position. It does not flow out of the joint because the capillary or similar phenomenon holds it in place in the manner described.

In Fig. 3 is shown a drop 27 which illustrates the manner in which the solder will appear at the bottom of the joint after complete circulation has been effected. This is the signal that the joint has been completely filled with solder.

Although the thimble 11 as shown tapers inwardly, it is to be understood that the invention is not to be so limited. Instead the thimble may be tapered in the reverse direction and the solder applied from the outside of said thimble. In this latter case, the solder would flow inwardly between the outer surface of the thimble and the inner surface of the counterbore and then outwardly between the inner surface of the thimble and the outer surface of the pipe, the drops of solder, indicating that the joint has been filled, flowing out around the pipe instead of around the fitting.

It is to be understood that the sealing material does not necessarily have to be solder or a like material. It may be any material, either a liquid or a solid which may be introduced into the joint in a liquid state and which will subsequently harden to effect a seal. Furthermore, the material does not necessarily have to be one that requires a heating of the joint or of the material in order to render the material liquid prior to its application to the joint.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawing shall be interpreted as illustrative and not in a limiting sense.

I claim:

1. A joint comprising a receiving portion, an element adapted to be introduced therein from the outside, a sleeve positioned between said receiving portion and said elements tapering inwardly from the outside of the joint, openings on said sleeve inwardly of the joint and a flange on said sleeve spaced from the end of said receiving portion.

2. In a joint, a receiving portion having a counterbore, a pipe adapted to telescope into said counterbore, there being a loose fit between the pipe and the counterbore, a thimble fitting over said pipe and spaced therefrom, said thimble being spaced from the counterbore, at least one opening in the thimble connecting the opposite sides thereof and an exterior flange on said thimble spaced from the outside end of the counterbore.

3. In a joint, a receiving portion having a counterbore, a pipe adapted to telescope into said counterbore, there being a loose fit between the pipe and the counterbore, a thimble fitting over said pipe and spaced therefrom, said thimble being spaced from the counterbore, at least one opening in the thimble connecting the opposite sides thereof and an exterior flange on said thimble spaced from the outside end of the counterbore, said thimble resting interiorly on the bottom of said counterbore.

In testimony whereof, I have signed my name to this specification this 5th day of May, 1930.

HAROLD K. RADER.